(12) United States Patent
Shiau (10) Patent No.: US 8,355,100 B2
(45) Date of Patent: Jan. 15, 2013

(54) LIQUID CRYSTAL DISPLAY PANEL

(75) Inventor: Yi-Hau Shiau, Taichung County (TW)

(73) Assignee: Au Optronics Corporation, Hsinchu (TW)

( * ) Notice: Subject to any disclaimer, the term of this patent is extended or adjusted under 35 U.S.C. 154(b) by 312 days.

(21) Appl. No.: 12/838,496

(22) Filed: Jul. 19, 2010

(65) Prior Publication Data

US 2011/0267566 A1 Nov. 3, 2011

(30) Foreign Application Priority Data

Apr. 29, 2010 (TW) ................................ 99113703 A (51) Int. Cl.
*G02F 1/1333* (2006.01)
(52) U.S. Cl. ...................................................... 349/110
(58) Field of Classification Search ................... 349/110
See application file for complete search history.

(56) References Cited

U.S. PATENT DOCUMENTS

| | | | |
|---|---|---|---|
| 6,268,896 B1 | 7/2001 | Takasaki et al. | |
| 6,912,025 B2 | 6/2005 | Lin et al. | |
| 7,050,131 B2 | 5/2006 | Choi et al. | |
| 7,253,866 B2 | 8/2007 | Moon et al. | |
| 2008/0192186 A1 * | 8/2008 | Nakagawa | 349/106 |

FOREIGN PATENT DOCUMENTS

| | | |
|---|---|---|
| TW | 200303439 | 9/2003 |
| TW | 200827882 | 7/2008 |

* cited by examiner

*Primary Examiner* — Timothy L Rude
(74) *Attorney, Agent, or Firm* — Jianq Chyun IP Office (57) ABSTRACT

An LCD panel includes an active device array substrate having a pixel array and fan-out lines electrically connected to the pixel array, an opposite substrate disposed above the active device array substrate, a sealant disposed between the active device array substrate and the opposite substrate, and a liquid crystal layer. The sealant surrounds the pixel array. The fan-out lines extend from the pixel array. The opposite substrate has light shielding patterns connecting the sealant that covers at least a portion of each fan-out line. In a region where the sealant is distributed, a slit between any two of the adjacent light shielding patterns exclusively overlaps one of the fan-out lines, and the number of the slits is less than the number of the fan-out lines. The liquid crystal layer is disposed between the active device array substrate and the opposite substrate.

6 Claims, 7 Drawing Sheets

LIQUID CRYSTAL DISPLAY PANEL

CROSS-REFERENCE TO RELATED APPLICATION

This application claims the priority benefit of Taiwan application serial no. 99113703, filed on Apr. 29, 2010. The entirety of the above-mentioned patent application is hereby incorporated by reference herein and made a part of specification.

BACKGROUND OF THE INVENTION

1. Field of the Invention

The invention relates to a panel. More particularly, the invention relates to a liquid crystal display (LCD) panel.

2. Description of Related Art

In general, an LCD panel is mainly comprised of an active device array substrate, an opposite substrate, and a liquid crystal layer sandwiched between the active device array substrate and the opposite substrate. The active device array substrate has a plurality of pixels arranged in an array, and each of the pixels includes an active device and a pixel electrode electrically connected to the active device. A plurality of scan lines and a plurality of data lines are disposed on the active device array substrate, and the active device in each of the pixels is electrically connected to the corresponding scan line and the corresponding data line.

The opposite substrate is a color filter substrate in most cases and is disposed above the active device array substrate. Besides, the opposite substrate includes a substrate, a light shielding pattern layer, a plurality of color filter patterns, and a transparent electrode layer. The color filter patterns are disposed within the light shielding pattern layer, and the transparent electrode layer covers the light shielding pattern layer and the color filter patterns. To connect the active device array substrate and the opposite substrate, a sealant surrounding the pixel array is often formed between the active device array substrate and the opposite substrate, and the liquid crystal layer is disposed within a closed space defined by the active device array substrate, the color filter substrate, and the sealant.

When the aforesaid LCD panel is completely formed, a pulling force testing process is frequently performed on the LCD panel, so as to ensure that the active device array substrate and the opposite substrate are securely bonded by the sealant and to prevent the liquid crystal layer from leaking. Nonetheless, since there exists significant difference between material properties of the transparent electrode layer and those of the light shielding pattern layer, it is found during the testing process that peeling phenomenon of the transparent electrode layer and the light shielding pattern layer often occurs due to lack of adhesion. Thus, light leakage arises in the LCD panel.

SUMMARY OF THE INVENTION

The invention is directed to an LCD panel having no light leakage and characterized by favorable display quality.

In the invention, an LCD panel including an active device array substrate, an opposite substrate, a sealant, and a liquid crystal layer is provided. The active device array substrate has a pixel array and a plurality of fan-out lines electrically connected to the pixel array. The opposite substrate is disposed above the active device array substrate. The sealant is disposed and/or connected between the active device array substrate and the opposite substrate, and the sealant substantially surrounds the pixel array. The fan-out lines extend from the pixel array to the sealant and substantially passing therethrough. The opposite substrate has a plurality of light shielding patterns connected to the sealant, and the sealant covers at least a portion of each of the fan-out lines. In a region where the sealant is distributed, a slit between any two of the adjacent light shielding patterns exclusively overlaps one of the fan-out lines, and the number of the slits is less than the number of the fan-out lines. The liquid crystal layer is disposed between the active device array substrate and the opposite substrate.

According to an embodiment of the invention, a width of each of the slits ranges from about 5 micrometers to about 200 micrometers, a width of each of the slits is less than a width of one of the fan-out lines underlying the corresponding slit, a ratio of an area of each of the slits in total to an area of each of the light shielding patterns in total is less than about 35/65, and parts of the light shielding patterns overlap two or more of the fan-out lines.

According to an embodiment of the invention, an extension direction of the each of the fan-out lines located in the region where the sealant is distributed is substantially parallel to an extension direction of each of the slits.

In the invention, an LCD panel including an active device array substrate, an opposite substrate, a sealant, and a liquid crystal layer is provided. The active device array substrate has a pixel array and a plurality of fan-out lines electrically connected to the pixel array. The opposite substrate is disposed above the active device array substrate and has a light shielding pattern. The light shielding pattern has a plurality of openings. A ratio of an area of each of the openings in total to an area of the light shielding pattern is less than about 35/65. The sealant is located between the fan-out lines and the light shielding pattern. The liquid crystal layer is disposed between the active device array substrate and the opposite substrate.

According to an embodiment of the invention, the sealant is black so that the light leakage can be prevented more efficiently.

According to an embodiment of the invention, the openings are not located above one side of the active device array substrate but exclusively located above the other three sides of the active device array substrate.

According to an embodiment of the invention, the openings are not located above two sides of the active device array substrate but exclusively located above the other two sides of the active device array substrate.

According to an embodiment of the invention, the openings are slits, and the slits divide the light shielding pattern into a plurality of separated patterns.

According to an embodiment of the invention, the openings are closed patterns.

According to an embodiment of the invention, the closed patterns are circular, elliptical or rectangular.

In the invention, an LCD panel including an active device array substrate, an opposite substrate, a sealant, and a liquid crystal layer is provided. The active device array substrate has a pixel array and a plurality of fan-out lines electrically connected to the pixel array. The opposite substrate is disposed above the active device array substrate. The sealant is disposed and/or connected between the active device array substrate and the opposite substrate, and the sealant substantially surrounds the pixel array. The fan-out lines extend from the pixel array to the sealant and passing therethrough. The opposite substrate has a plurality of light shielding patterns connected to the sealant, and the sealant covers at least a portion of each of the fan-out lines. In a region where the sealant is distributed, a slit between any two of the adjacent light shielding patterns is exclusively located right above one of the fan-out lines but not located right above another one of the fan-out lines, and the number of the slits is less than the number of the fan-out lines. The liquid crystal layer is disposed between the active device array substrate and the opposite substrate.

Based on the above, the opposite substrate in the LCD panel of the invention has the slits among the light shielding patterns. Alternatively, the opposite substrate has the light shielding pattern with the openings. The slits among the light shielding patterns or the openings of the light shielding pattern are disposed corresponding to the fan-out lines of the active device array substrate. As such, the light leakage in the LCD panel can be effectively prevented, and the adhesion between the active device array substrate and the opposite substrate can be enhanced, so as to improve the display quality of the LCD panel.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
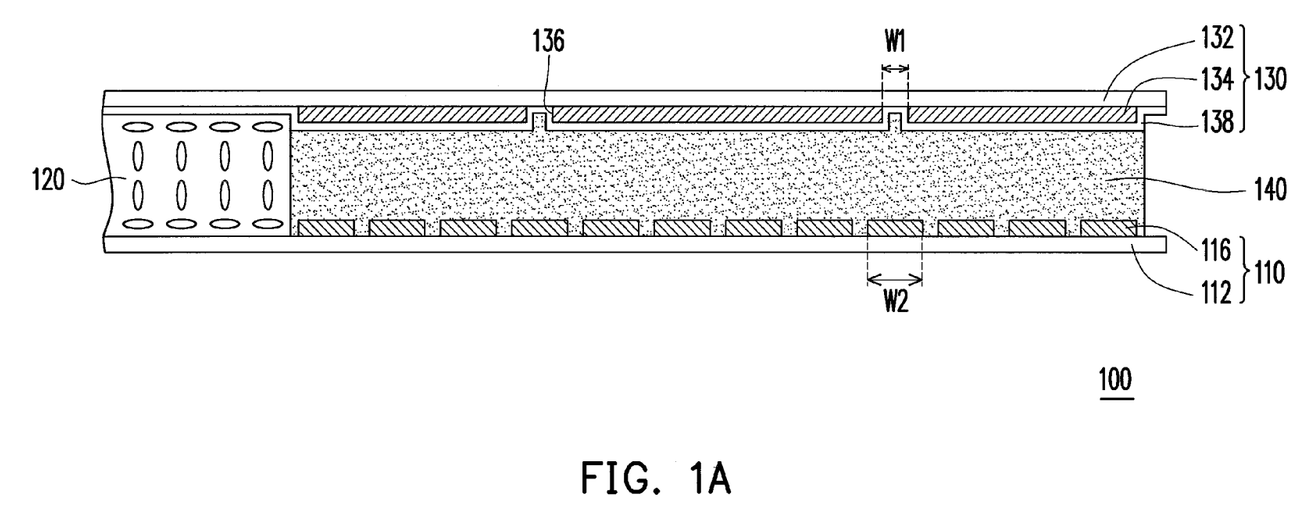
FIG. 1A is a schematic cross-sectional view illustrating an LCD panel according to an embodiment of the invention.
Figure 1B:
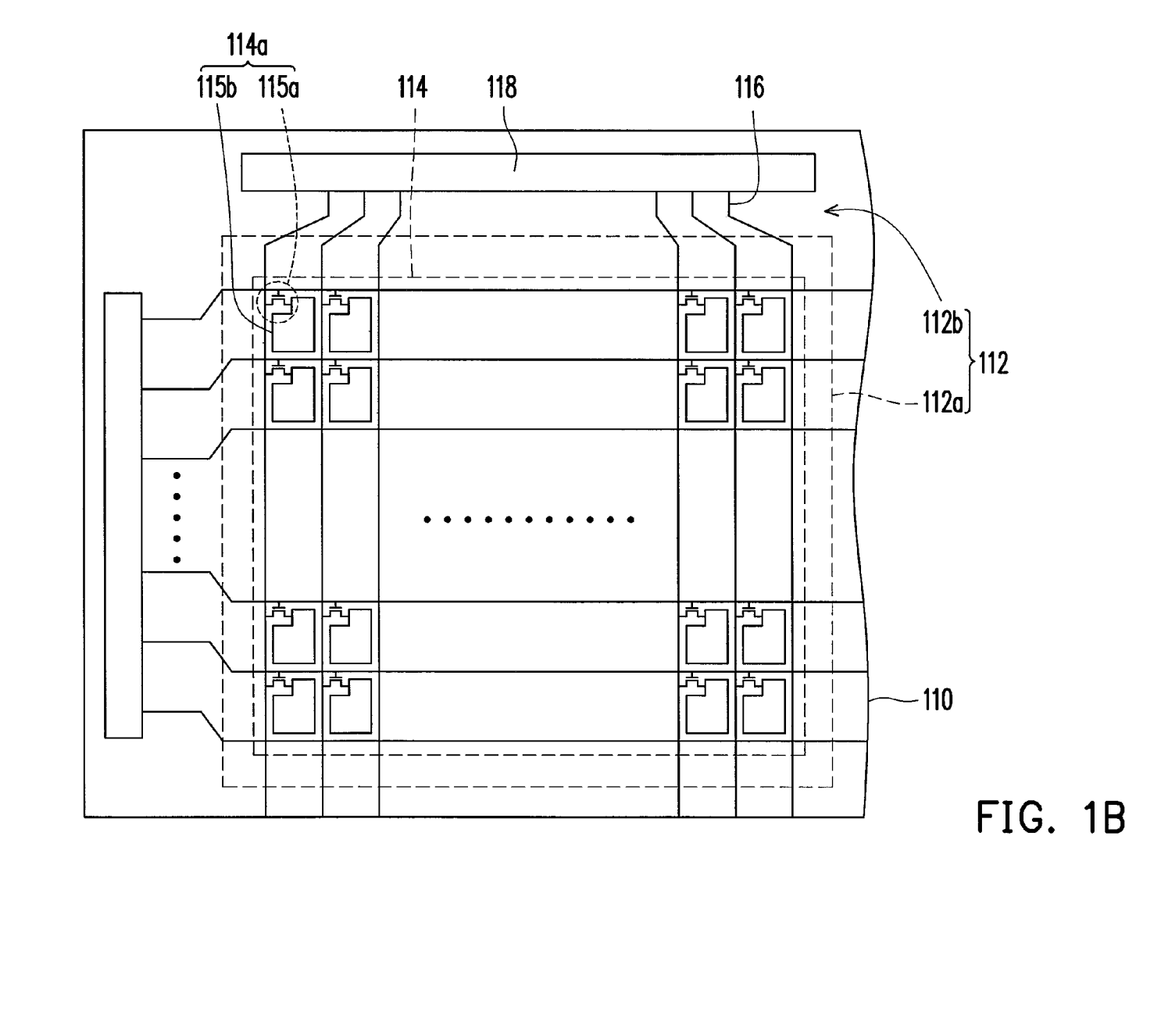
FIG. 1B is a schematic top view illustrating an active device array substrate depicted in FIG. 1A.
Figure 1C:
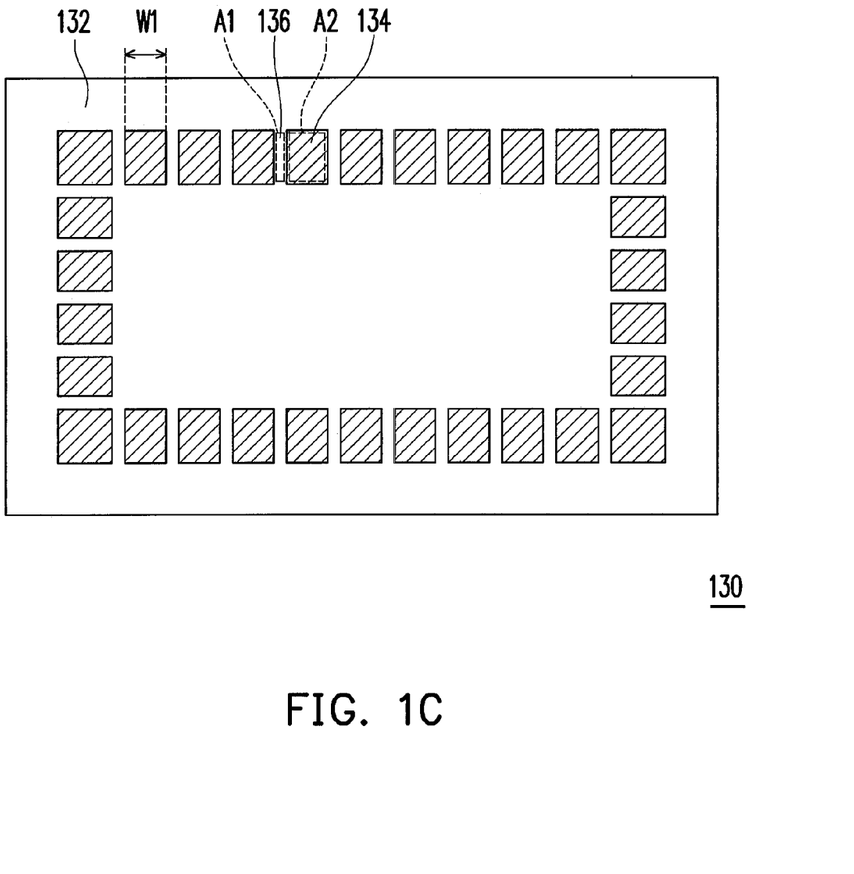
FIG. 1C is a schematic top view illustrating an opposite substrate depicted in FIG. 1A.

FIG. 1A is a schematic cross-sectional view illustrating an LCD panel according to an embodiment of the invention. FIG. 1B is a schematic top view illustrating an active device array substrate depicted in FIG. 1A. FIG. 1C is a schematic top view illustrating an opposite substrate depicted in FIG. 1A. A transparent electrode layer 138 is omitted in FIG. 1C. As shown in FIG. 1A, an LCD panel 100 has an active device array substrate 110, an opposite substrate 130, a sealant 140, and a liquid crystal layer 120. The opposite substrate 130 is disposed above the active device array substrate 110. The sealant 140 is disposed or connected between the active device array substrate 110 and the opposite substrate 130. The liquid crystal layer 120 is disposed between the active device array substrate 110 and the opposite substrate 130.

With reference to FIG. 1B, in this embodiment, the active device array substrate 110 includes a substrate 112, a pixel array 114, and fan-out lines 116. The substrate 112, for example, has an active area 112a and a peripheral circuit area 112b connected to the active area 112a. The pixel array 114, for example, is disposed on the active area 112a of the substrate 112, and the pixel array 114 includes a plurality of pixels 114a disposed on the active area 112a. The fan-out lines 116, for example, extend to the peripheral circuit area 112b from the active area 112a and are electrically connected to the pixels 114a. In this embodiment, the pixel 114a includes active devices 115a of thin film transistors (TFTs) and pixel electrodes 115b electrically connected to the active devices 115a. The fan-out lines 116 disposed around the pixels 114a, for example, are horizontally extended scan lines and vertically extended data lines. In this embodiment, the fan-out lines 116, for instance, are connected to a driving circuit 118 located in the peripheral circuit area 112b, such that the driving circuit 118 can connect the active devices 115a of the corresponding pixels 114a to drive the pixels 114a. Here, a material of the fan-out lines 116 is, for example, chromium, molybdenum, or any other non-transparent metallic material.

As indicated in FIG. 1A and FIG. 1B, the sealant 140 is connected between the active device array substrate 110 and the opposite substrate 130. Besides, the sealant 140 surrounds the pixel array 114. The fan-out lines 116 extend from the pixel array 114 to the sealant 140 and pass therethrough. Furthermore, the sealant 140 may cover a portion of the areas between the fan-out lines 116. The sealant 140 covers at least a portion of each of the fan-out lines 116. In this embodiment, the sealant 140, for example, covers a portion of each of the fan-out lines 116 and the areas between the fan-out lines 116 located in the peripheral circuit area 112b. The sealant 140 can be formed on the active device array substrate 110 or on the opposite substrate 130, and the sealant 140 can be transparent or non-transparent.

With reference to FIG. 1A, the opposite substrate 130 of this embodiment is a color filter substrate, for instance. The opposite substrate 130 includes a substrate 132, a plurality of light shielding patterns 134 connected to the sealant 140, and the transparent electrode 138. The light shielding patterns 134 are disposed on the substrate 132, and a slit 136 is formed between any two adjacent light shielding patterns 134. The transparent electrode layer 138, for example, covers the light shielding patterns 134 and is in contact with the substrate 132 through the slits 136 among the light shielding patterns 134. Here, a material of the light shielding patterns 134 is resin or metal, for example, and a material of the transparent electrode layer 138 is indium tin oxide (ITO), for example. According to this embodiment, in the region where the sealant 140 is distributed, the slit 136 between any two of the adjacent light shielding patterns 134, for example, exclusively overlaps one of the fan-out lines 116, and the number of the slits 136 is less than the number of the fan-out lines 116. Particularly, the slit 136 between any two of the adjacent light shielding patterns 134, for example, completely overlaps one of the fan-out lines 116. The slit 136 between any two of the adjacent light shielding patterns 134, for example, is exclusively located right above one of the fan-out lines 116 but not located above another one of the fan-out lines 116. That is to say, each of the slits 136 of this embodiment corresponds to one of the fan-out lines 116, for instance. Since the slits 136 overlap the fan-out lines 116 according to this embodiment, the fan-out lines 116 or the light shielding patterns 134 are capable of blocking light from the active device array substrate 110 (e.g. light from a backlight module) or blocking light from the opposite substrate 130 (e.g. ambient light). Herein, parts of the light shielding patterns 134, for example, covers two or more of the fan-out lines 116. For instance, one of the light shielding patterns 134 covers two, three, four, five, or more of the fan-out lines 116. Namely, a ratio of one of the light shielding patterns 134 to the number of the fan-out lines 116 underlying the one of the light shielding patterns 134 can be ½, ⅓, ¼, ⅕, or the like. A width W1 of each of the slits 136 exemplarily ranges from about 5 micrometers to about 200 micrometers, and the width W1 of each of the slits 136 is exemplarily less than a width W2 of one of the fan-out lines 116 underlying the corresponding slit 136. Hence, the light shielding patterns 134 around the slits 136 overlap the fan-out lines 116 underlying the light shielding patterns 134. In the region where the sealant 140 is distributed, an extension direction of each of the fan-out lines 116 is substantially parallel to an extension direction of each of the slits 136, for example.

The width W1 of each of the slits 136 can be the same or different. In other words, the light shielding patterns 134 can be arranged in an equidistant manner or in a non-equidistant manner. The fan-out lines 116 can also be arranged in an equidistant manner or in a non-equidistant manner. The width W2 of each of the fan-out lines 116 can be the same or different, which results in different ratios of the width W1 of each of the slits 136 to the width W2 of each of the fan-out lines 116. Here, the ratio of the width W1 of each of the slits 136 to the width W2 of each of the fan-out lines 116 can be about 0.5/2.5, 0.5/5, 0.5/10, or the like.

As shown in FIG. 1C, a ratio of an area A1 of each of the slits 136 in total to an area A2 of each of the light shielding patterns 134 in total is less than about 35/65, for instance. That is to say, a ratio of the area A1 of each of the slits 136 in total to the area A1 of each of the slits 136 and the area A2 of each of the light shielding patterns 134 in total is less than about 35/100, for instance, i.e. an aperture ratio of the light shielding patterns 134 is less than about 35%, for instance. The arrangement of the slits 136 among the light shielding patterns 134 and the fan-out lines 116, as indicated in FIG. 1A and FIG. 1C, allows the light from the active device array substrate 110 (e.g. the light from the backlight module) or the light from the opposite substrate 130 (e.g. the ambient light) to be blocked, and the light shielding patterns 134 can have an appropriate aperture ratio. Thereby, the LCD panel 100 can have favorable display quality.

In the LCD panel 100 of this embodiment, the slits 136 among the light shielding patterns 134 in the opposite substrate 130 and the fan-out lines 116 in the active device array substrate 110 are correspondingly arranged. Therefore, the fan-out lines 116 or the light shielding patterns 134 are capable of blocking the light from the active device array substrate 110 (e.g. the light from the backlight module) or blocking the light from the opposite substrate 130 (e.g. the ambient light), such that the light is not apt to enter the LCD panel 100 from the slits 136 among the light shielding patterns 134 or from spaces among the fan-out lines 116. Accordingly, the light leakage in the LCD panel 100 can be effectively prevented, and the light shielding patterns 134 can have an appropriate aperture ratio, so as to improve the display quality of the LCD panel 100. Moreover, the arrangement of the light shielding patterns 134 and the fan-out lines 116 ensures favorable light shielding capacity. Thus, the LCD panel 100 of this embodiment is applicable to the LCD panel with the narrow border design, and the transparent sealant that is unable to block light can be used in the LCD panel 100. Further, in this embodiment, owing to the slits 136 among the light shielding patterns 134, the transparent electrode layer 138 formed on the light shielding patterns 134 can also be formed in the slits 136 among the light shielding patterns 134 and thus can be in contact with the substrate 132. Thereby, both the adhesion between the transparent electrode layer 138 and the light shielding patterns 134 and the adhesion between the active device array substrate 110 and the opposite substrate 130 can be enhanced, such that the light leakage caused by the peeling of the transparent electrode layer 138 and the light shielding patterns 134 does not occur. As a result, the LCD panel 100 can have favorable yield and satisfactory display quality.

According to the previous embodiment, the opposite substrate 130 exemplarily has a plurality of light shielding patterns 134, while the opposite substrate 130 in another embodiment can have one light shielding pattern 134.

Figure 2A:
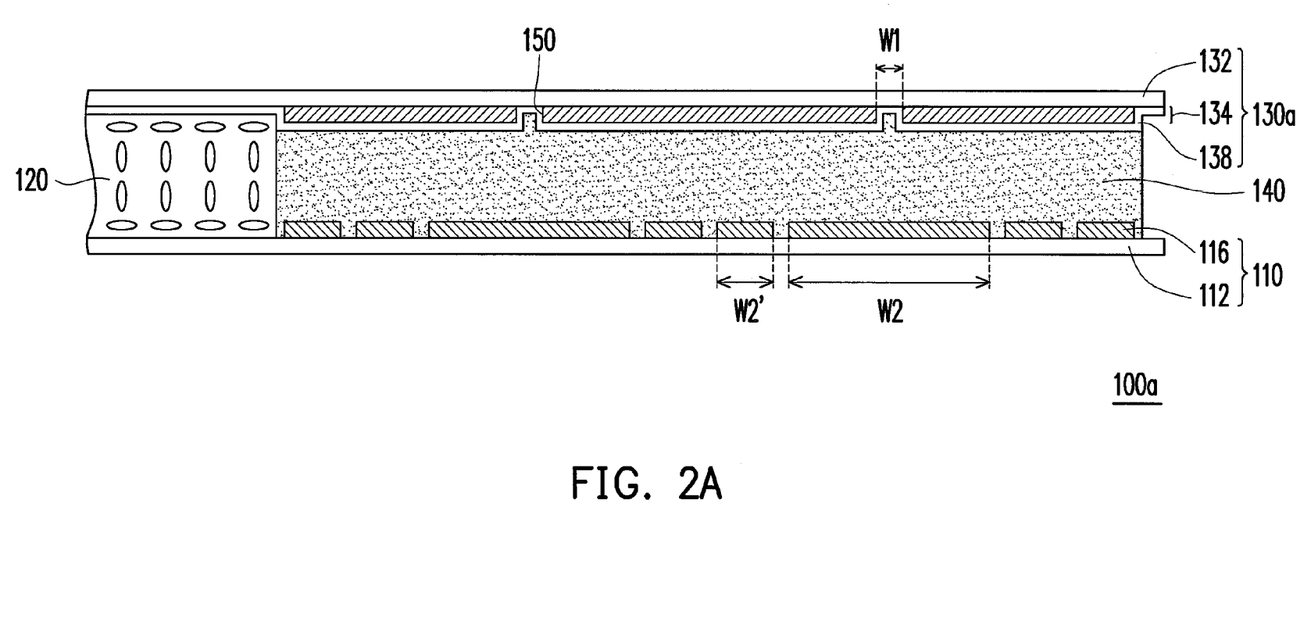
FIG. 2A is a schematic cross-sectional view illustrating an LCD panel according to another embodiment of the invention.
Figure 2B:
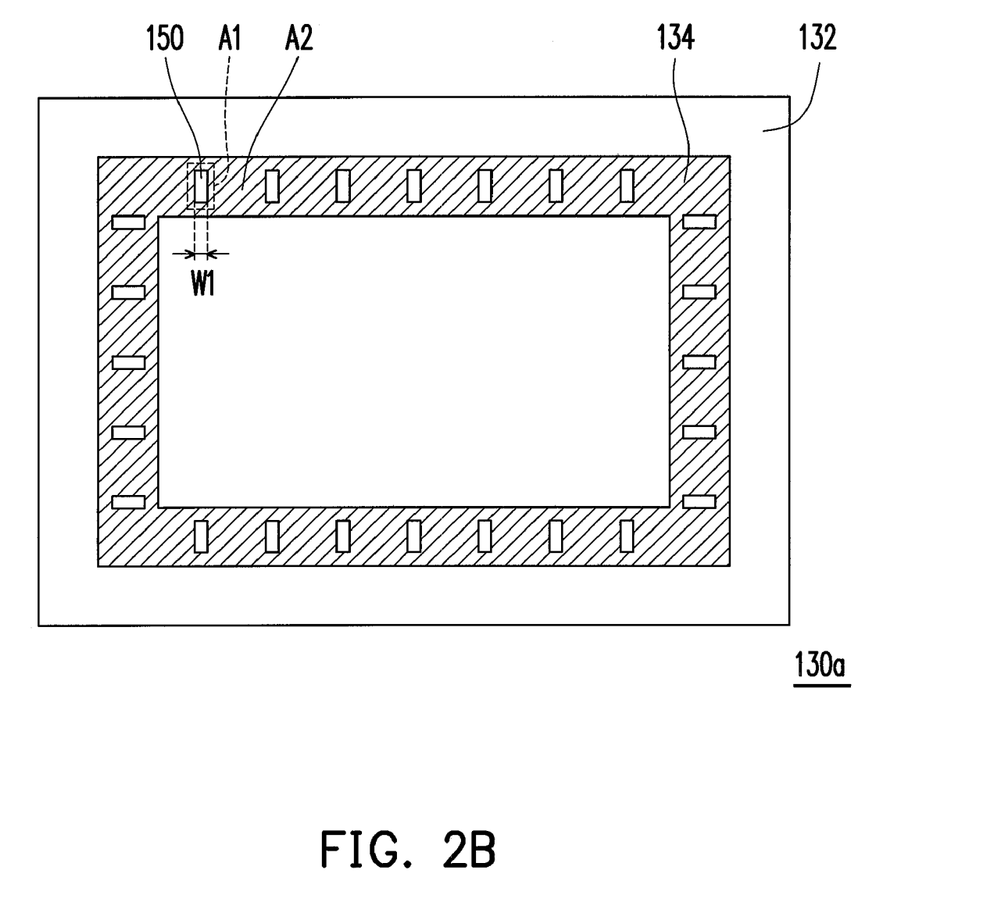
FIG. 2B is a schematic top view illustrating an opposite substrate depicted in FIG. 2A.

FIG. 2A is a schematic cross-sectional view illustrating an LCD panel according to another embodiment of the invention. FIG. 2B is a schematic top view illustrating an opposite substrate depicted in FIG. 2A. The transparent electrode layer 138 is omitted in FIG. 2B. As shown in FIG. 2A, an LCD panel 100a includes an active device array substrate 110, an opposite substrate 130a, a sealant 140, and a liquid crystal layer 120. The liquid crystal layer 120 is disposed between the active device array substrate 110 and the opposite substrate 130a. The active device array substrate 110 has the pixel array 114 and the fan-out lines 116 electrically connected to the pixel array 114. The structure of the active device array substrate 110 depicted in FIG. 2A is similar to the structure of the active device array substrate 110 depicted in FIG. 1B; therefore, relevant descriptions that have been provided before with reference to FIG. 1B are not provided hereinafter.

With reference to FIG. 2A and FIG. 2B, the opposite substrate 130a is disposed above the active device array substrate 110 and includes a substrate 132, a light shielding pattern 134, and a transparent electrode layer 138. The light shielding pattern 134 is disposed on the substrate 132 and has a plurality of openings 150. A ratio of an area A1 of each of the openings 150 in total to an area A2 of the light shielding pattern 134 is less than about 35/65. The transparent electrode layer 138, for example, covers the light shielding pattern 134 and is in contact with the substrate 132 through the openings 150 of the light shielding pattern 134. Here, a material of the light shielding pattern 134 is resin or metal, for example, and a material of the transparent electrode layer 138 is ITO, for example. The sealant 140 is located between the fan-out lines 116 and the light shielding pattern 134. In this embodiment, the sealant 140, for example, is disposed between the light shielding pattern 134 and the fan-out lines 116 that are located in the peripheral circuit area 112b. In addition, the sealant 140 can be formed on the active device array substrate 110 or on the opposite substrate 130, and the sealant 140 can be transparent or non-transparent. The sealant 140 may be black, colored or transparent. Selectively, the sealant 140 is black so that the light leakage can be prevented more efficiently.

With reference to FIG. 2A, in this embodiment, each of the openings 150 of the light shielding pattern 134, for example, exclusively overlaps one of the fan-out lines 116, and the number of the openings 150 is less than the number of the fan-out lines 116. Particularly, each of the openings 150 of the light shielding pattern 134, for example, completely overlaps one of the fan-out lines 116. Since the openings 150 overlap the fan-out lines 116, the fan-out lines 116 or the light shielding pattern 134 is capable of blocking the light from the active device array substrate 110 (e.g. the light from the backlight module) or blocking the light from the opposite substrate 130 (e.g. the ambient light). A width W1 of each of the openings 150 exemplarily ranges from about 5 micrometers to about 200 micrometers, and the width W1 of each of the openings 150 is exemplarily less than a width W2 of one of the fan-out lines 116 underlying the corresponding opening 150. In the region where the sealant 140 is distributed, an extension direction of each of the fan-out lines 116 is substantially parallel to an extension direction of each of the openings 150, for example. According to this embodiment, the fan-out lines 116, for example, have different widths W2 and W2'. The width W1 of each of the openings 150 is exemplarily less than the width W2 of one of the fan-out lines 116 underlying the corresponding opening 150, and the width W2 of some of the fan-out lines 116 corresponding to the openings 150, for example, is greater than the width W2' of the other fan-out lines 116 not corresponding to the openings 150. As such, even though the light from the active device array substrate 110 enters the sealant 140 through the spaces among the fan-out lines 116, or the light from the opposite substrate 130 enters the sealant 140 through the openings 150, the light is not apt to be emitted out through the openings 150 of the light shielding pattern 134 or emitted out through the spaces among the fan-out lines 116 because the openings 150 of the light shielding pattern 134 and the spaces among the fan-out lines 116 are interlaced and separated from one another. Namely, the width W1 of each of the openings 150 is designed to be less than the width W2 of the fan-out lines 116 underlying the openings 150, so as to ensure that the light is not apt to be emitted out through the openings 150 of the light shielding pattern 134. Note that the width W1 of each of the openings 150, the width W2 of each of the fan-out lines 116, and the spaces among the fan-out lines 116 are not limited in this invention. People having ordinary skill in the art can modify said parameters at will based on actual requirements for products.

Figure 3:
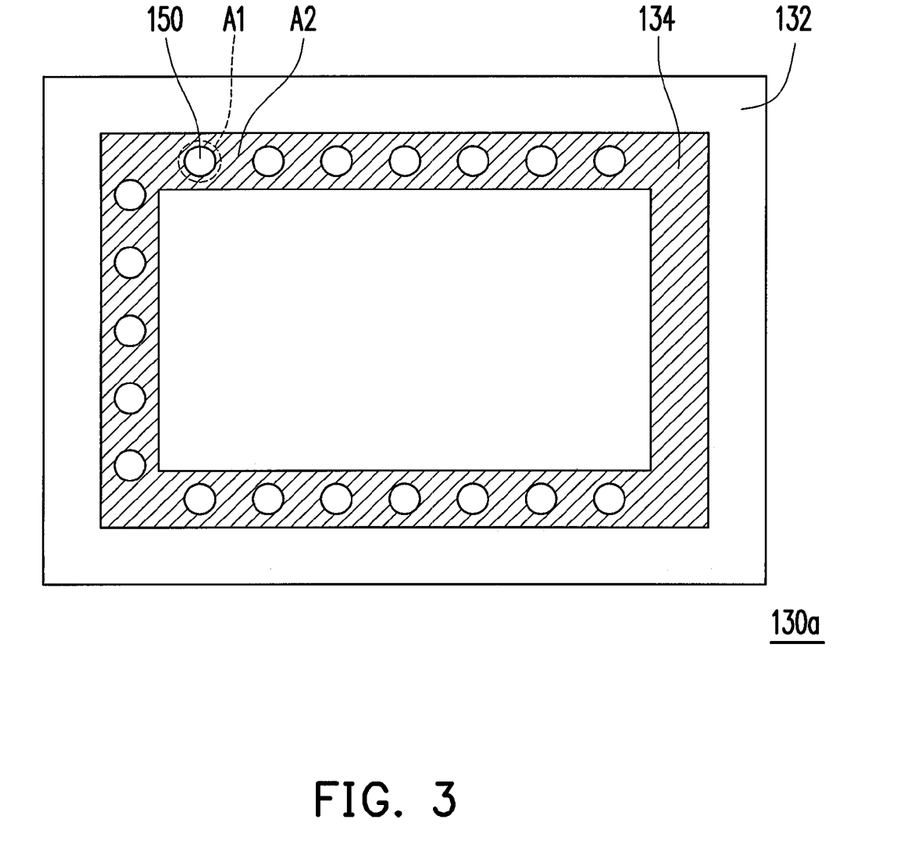
FIG. 3 is a schematic top view illustrating another opposite substrate depicted in FIG. 2A.
Figure 4:
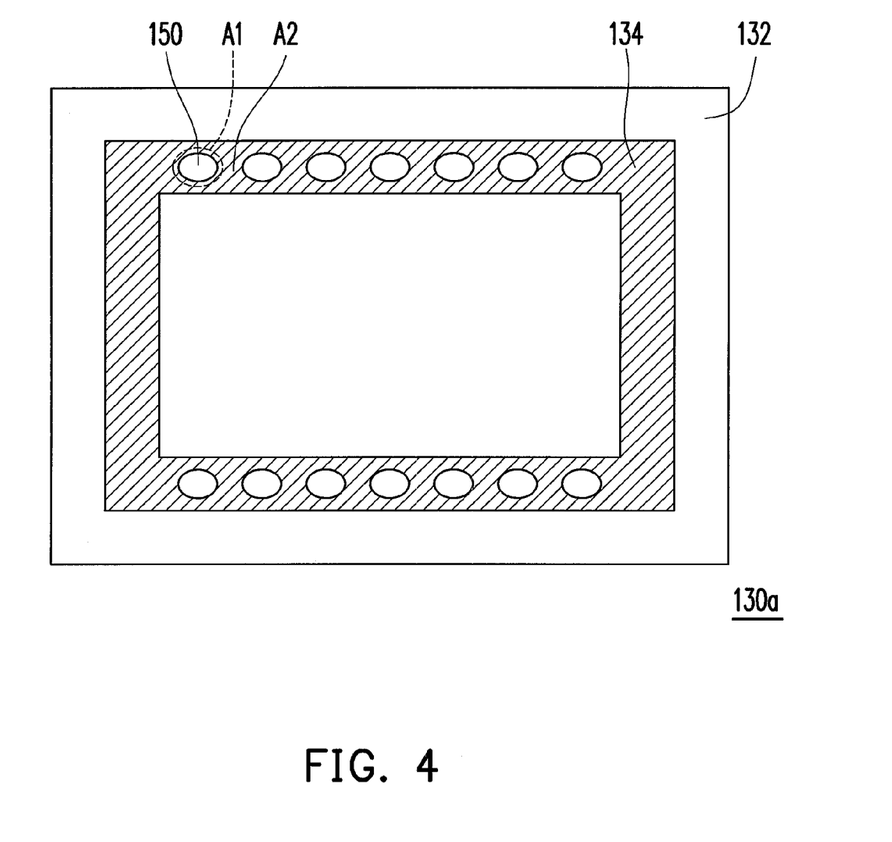
FIG. 4 is a schematic top view illustrating still another opposite substrate depicted in FIG. 2A.

As shown in FIG. 2B, in this embodiment, the openings 150 of the light shielding pattern 134 are distributed at each side of the substrate 132, for instance. In other words, when the opposite substrate 130a and the active device array substrate 110 are assembled to form the LCD panel 100a depicted in FIG. 2A, the openings 150 of the light shielding pattern 134, for example, are located above each side of the active device array substrate 110. Nonetheless, in another embodiment depicted in FIG. 3, the openings 150 of the light shielding pattern 134, for example, are exclusively distributed at three sides of the substrate 132 but not at the remaining side of the substrate 132. In other words, when the opposite substrate 130a and the active device array substrate 110 are assembled to form the LCD panel 100a depicted in FIG. 2A, the openings 150 of the light shielding pattern 134, for example, are located exclusively above three sides of the active device array substrate 110 but not above the remaining side of the active device array substrate 110. Undoubtedly, in still another embodiment depicted in FIG. 4, the openings 150 of the light shielding pattern 134 in the opposite substrate 130a, for example, can be exclusively distributed at two sides of the substrate 132 but not at the other two sides of the substrate 132. Hence, when the opposite substrate 130a and the active device array substrate 110 are assembled to form the LCD panel 100a depicted in FIG. 2A, the openings 150 of the light shielding pattern 134, for example, are located exclusively above two sides of the active device array substrate 110 but not above the other two sides of the active device array substrate 110. Here, the openings 150 are closed patterns, for example, and the close patterns can be rectangular (shown in FIG. 2B), circular (shown in FIG. 3), elliptical (shown in FIG. 4), or in any other shape.

According to this embodiment, a ratio of an area A1 of each of the openings 150 in total to an area A2 of the light shielding pattern 134 is less than about 35/65. That is to say, a ratio of the area A1 of each of the openings 150 in total to the area A1 of each of the openings 150 and the area A2 of the light shielding pattern 134 in total is less than about 35/100, for instance, i.e. an aperture ratio of the light shielding pattern 134 is less than about 35%, for instance. The arrangement of the openings 150 of the light shielding pattern 134 and the fan-out lines 116, as indicated in FIG. 2A, FIG. 2B, FIG. 3, and FIG. 4, allows the light from the active device array substrate 110 (e.g. the light from the backlight module) or the light from the opposite substrate 130 (e.g. the ambient light) to be blocked, and the light shielding pattern 134 can have an appropriate aperture ratio. Thereby, the LCD panel 100a can have favorable display quality.

In the LCD panel 100a of this embodiment, the openings 150 of the light shielding pattern 134 in the opposite substrate 130 and the fan-out lines 116 in the active device array substrate 110 are correspondingly arranged, and the ratio of the area A1 of each of the openings 150 in total to the area A2 of the light shielding pattern 134 is less than about 35/65. Accordingly, the light leakage in the LCD panel 100a can be effectively prevented, and the light shielding pattern 134 can have an appropriate aperture ratio, so as to improve the display quality of the LCD panel 100a. Furthermore, in this embodiment, owing to the openings 150 of the light shielding pattern 134, the transparent electrode layer 138 formed on the light shielding pattern 134 can also be formed in the openings 150 of the light shielding pattern 134 and thus can be in contact with the substrate 132. Thereby, both the adhesion between the transparent electrode layer 138 and the light shielding pattern 134 and the adhesion between the active device array substrate 110 and the opposite substrate 130 can be enhanced, such that the light leakage caused by the peeling phenomenon of the transparent electrode layer 138 and the light shielding pattern 134 does not occur. As a result, the LCD panel 100a can have favorable yield and satisfactory display quality.

In light of the foregoing, the opposite substrate in the LCD panel of the invention has the slits among the light shielding patterns. Alternatively, the opposite substrate has the light shielding pattern with the openings. The slits among the light shielding patterns or the openings of the light shielding pattern are disposed corresponding to the fan-out lines of the active device array substrate. Thereby, the fan-out lines or the light shielding patterns are capable of blocking the light from the active device array substrate or blocking the light from the opposite substrate (e.g. the light from the backlight module or the ambient light), such that the light is not apt to be emitted out through the slits among the light shielding patterns in the opposite substrate, emitted out through the openings of the light shielding pattern, or emitted out through the spaces among the fan-out lines. As such, the light leakage in the LCD panel can be prevented, and the LCD panel can have favorable display quality. Additionally, the transparent electrode layer formed on the light shielding pattern(s) can be formed in the slits among the light shielding patterns or in the openings of the light shielding pattern, and the transparent electrode layer can then be in contact with the substrate, so as to enhance the adhesion between the substrate and the transparent electrode layer as well as the light shielding pattern(s). Thus, the light leakage caused by peeling off the light shielding pattern(s) from the substrate does not occur. As such, the light leakage in the LCD panel can be prevented in an effective manner, and the LCD panel can have favorable display quality. As a result, the LCD panel of the invention can have favorable yield and satisfactory display quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A liquid crystal display panel comprising:
an active device array substrate having a pixel array and a plurality of fan-out lines electrically connected to the pixel array;
an opposite substrate disposed above the active device array substrate;
a sealant disposed between the active device array substrate and the opposite substrate, the sealant substantially surrounding the pixel array, the opposite substrate having a plurality of light shielding patterns connected to the sealant, the sealant covering at least a portion of each of the fan-out lines, wherein in a region where the sealant is distributed, a slit between any two adjacent light shielding patterns of the light shielding patterns exclusively overlaps one of the fan-out lines, and the number of the slits is less than the number of the fan-out lines; and
a liquid crystal layer disposed between the active device array substrate and the opposite substrate.

2. The liquid crystal display panel as claimed in claim 1, wherein a width of each of the slits ranges from about 5 micrometers to about 200 micrometers, a width of each of the slits is less than a width of one of the fan-out lines underlying the corresponding slit, a ratio of an area of each of the slits in total to an area of each of the light shielding patterns in total is less than about 35/65, and parts of the light shielding patterns overlap two or more of the fan-out lines.

3. The liquid crystal display panel as claimed in claim 1, wherein an extension direction of the each of the fan-out lines located in the region where the sealant is distributed is substantially parallel to an extension direction of each of the slits.

4. The liquid crystal display panel as claimed in claim 1, wherein the sealant is black.

5. A liquid crystal display panel comprising:
an active device array substrate having a pixel array and a plurality of fan-out lines electrically connected to the pixel array;
an opposite substrate disposed above the active device array substrate;
a sealant disposed between the active device array substrate and the opposite substrate, the sealant substantially surrounding the pixel array, the opposite substrate having a plurality of light shielding patterns connected to the sealant, the sealant covering at least a portion of each of the fan-out lines, wherein in a region where the sealant is distributed, a slit between any two adjacent light shielding patterns of the light shielding patterns is exclusively located right above one of the fan-out lines but not located right above another one of the fan-out lines, and the number of the slits is less than the number of the fan-out lines; and
a liquid crystal layer disposed between the active device array substrate and the opposite substrate.

6. The liquid crystal display panel as claimed in claim 5, wherein the sealant is black.

* * * * *